(12) United States Patent
Kowtun et al.

(10) Patent No.: US 9,124,081 B2
(45) Date of Patent: Sep. 1, 2015

(54) POWER DISTRIBUTION BOX HAVING INTERLOCKING SUPPORT MODULES

(71) Applicant: Lear Corporation, Southfield, MI (US)

(72) Inventors: Peter Kowtun, Plymouth, MI (US); Brian M. Hood, Clinton Township, MI (US)

(73) Assignee: Lear Corporation, Southfield, MI (US)

( * ) Notice: Subject to any disclaimer, the term of this patent is extended or adjusted under 35 U.S.C. 154(b) by 2 days.

(21) Appl. No.: 14/149,254

(22) Filed: Jan. 7, 2014

(65) Prior Publication Data

US 2014/0196925 A1     Jul. 17, 2014

Related U.S. Application Data

(60) Provisional application No. 61/752,119, filed on Jan. 14, 2013.

(51) Int. Cl.
*H02G 3/08* (2006.01)
*H02G 3/16* (2006.01)

(52) U.S. Cl.
CPC ...................... *H02G 3/16* (2013.01)

(58) Field of Classification Search
CPC ........... H02G 3/081; H02G 3/16; H01R 9/14; H01R 9/2408; H01R 25/161; H01R 25/00; H01R 13/514
USPC ............. 174/50, 50.52, 50.54, 520, 535, 542, 174/559, 560, 561; 361/600, 728, 730, 731, 361/732, 622; 439/76.2, 701, 717
See application file for complete search history.

(56) References Cited

U.S. PATENT DOCUMENTS

| | | | | |
|---|---|---|---|---|
| 3,514,743 | A * | 5/1970 | Schantz | 439/557 |
| 4,171,862 | A * | 10/1979 | Krasser | 439/717 |
| 5,295,870 | A * | 3/1994 | Rei et al. | 439/717 |
| 5,915,978 | A * | 6/1999 | Hayakawa et al. | 439/76.2 |
| 6,196,882 | B1 * | 3/2001 | Sato et al. | 439/701 |
| 6,833,503 | B2 * | 12/2004 | Lopez et al. | 174/50 |
| 6,846,183 | B2 * | 1/2005 | Kato et al. | 439/20 |
| 7,591,653 | B2 * | 9/2009 | Boileau et al. | 439/76.2 |
| 7,893,364 | B2 * | 2/2011 | Oda | 174/520 |
| 8,907,213 | B2 * | 12/2014 | I et al. | 174/50 |
| 8,947,859 | B2 * | 2/2015 | Froschmeier et al. | 361/601 |

* cited by examiner

*Primary Examiner* — Angel R Estrada
*Assistant Examiner* — Dimary Lopez Cruz
(74) *Attorney, Agent, or Firm* — Dykema Gossett PLLC

(57) ABSTRACT

A power distribution box may include a first support module having interconnectable elements provided on a plurality of sides thereof, and a second support module having interconnectable elements provided on a plurality of sides thereof. An interconnectable element on the first support module may be interconnected with an interconnectable element on the second support module to connect the first and second support modules together to form a body of the power distribution box having one of a plurality of possible configurations which define different footprints.

20 Claims, 7 Drawing Sheets

POWER DISTRIBUTION BOX HAVING INTERLOCKING SUPPORT MODULES

CROSS-REFERENCE TO RELATED APPLICATIONS

This application claims the benefit of U.S. Provisional Application Ser. No. 61/752,119, filed Jan. 14, 2013, the disclosure of which is incorporated herein by reference in its entirety.

TECHNICAL FIELD

The present disclosure relates to power distribution boxes, including a power distribution box having a plurality of support modules connected together to form a body of the power distribution box.

BACKGROUND

Power distribution boxes and electrical junction boxes are commonly used in electrical systems of automobiles and other types of vehicles to support a variety of electrical components. The electrical components, in turn, can be configured to distribute power and/or relay signals between various subsystems and other electronic devices in the automobile.

A typical power distribution box may include a non-conductive body or frame. The electrical components can be supported on the body. A wire harness having an end connector and a plurality of wires can be attached to the body for connection with the electrical components. The wires can be routed to various subsystems and other electronic devices in the automobile. A cover may be provided on the body to enclose and protect the electrical components.

It is common for power distribution boxes to be located within an engine compartment of an automobile. However, different makes and models of automobiles generally have different amounts of allowable space in the engine compartment and provide different mounting configurations for the power distribution box. As such, power distribution boxes may be specifically designed for particular makes and models of automobiles, which can result in increased design costs, manufacturing costs, and inventory costs.

Although known power distribution boxes function in an acceptable manner, it would be desirable to provide a power distribution box including a plurality of support modules that can be connected together to form a body of the power distribution box having one of a plurality of possible configurations which define different footprints.

SUMMARY

In an embodiment of the present disclosure, a power distribution box may include a first support module having interconnectable elements provided on a plurality of sides thereof, and a second support module having interconnectable elements provided on a plurality of sides thereof. An interconnectable element on the first support module may be interconnected with an interconnectable element on the second support module to connect the first and second support modules together to form a body of the power distribution box having one of a plurality of possible configurations which define different footprints.

Various aspects of this invention will become apparent to those skilled in the art from the following detailed description of the preferred embodiment, when read in light of the accompanying drawings.

DETAILED DESCRIPTION

Reference will now be made in detail to embodiments of the present disclosure, examples of which are described herein and illustrated in the accompanying drawings. While the invention will be described in conjunction with embodiments, it should be understood that they are not intended to limit the invention to these embodiments. On the contrary, the invention is intended to cover alternatives, modifications and equivalents, which may be included within the spirit and scope of the invention as defined by the appended claims.

Figure 1:
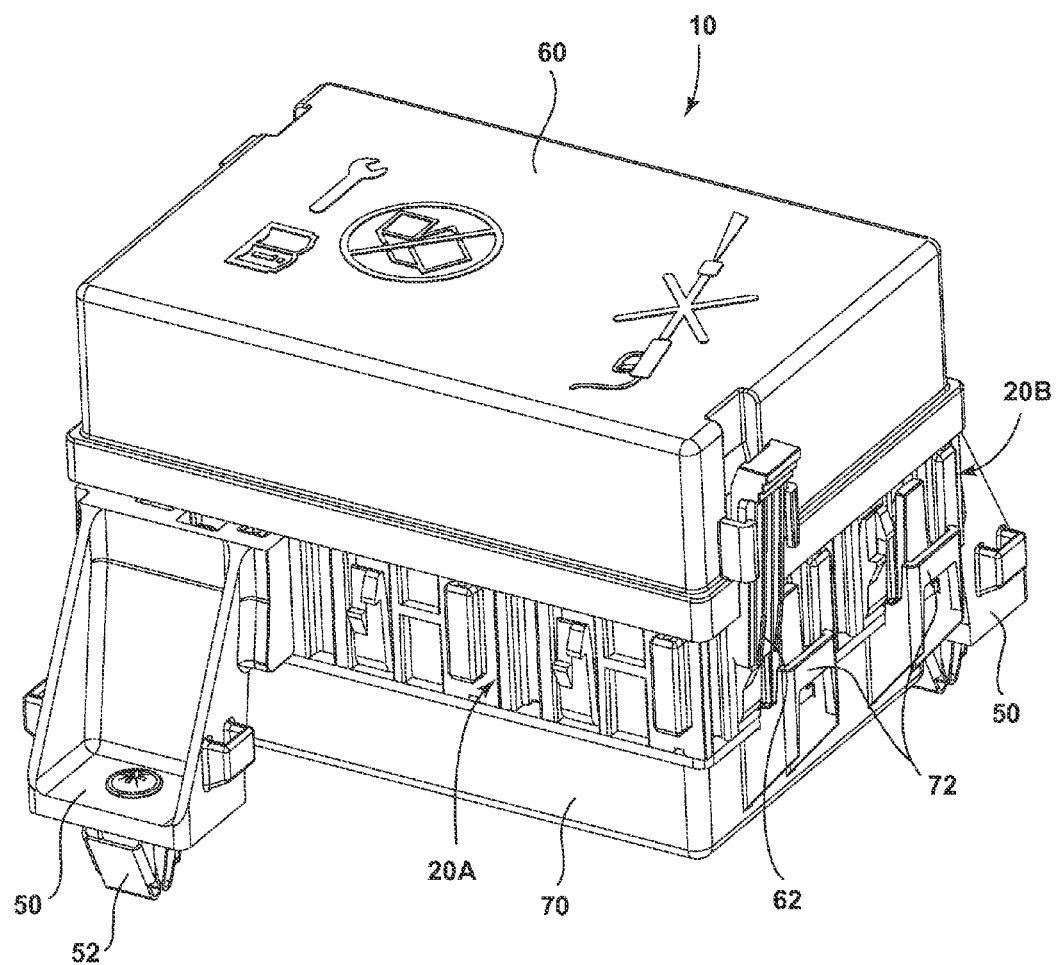
FIG. 1 is a perspective view of a power distribution box that includes a plurality of support modules connected together according to an embodiment of the present disclosure.

Referring now to FIG. 1, a power distribution box according to an embodiment of the present disclosure is generally illustrated at 10. In a non-limiting example, the power distribution box 10 can be used in an electrical system of an automobile or other type of vehicle. In such an example, the power distribution box 10 may support a wide-variety of electrical components that can be configured to, among other things, distribute power and/or relay signals between various subsystems and other electronic devices in the automobile. It should be appreciated, however, that the power distribution box 10 can be used in other suitable environments and for other suitable purposes.

Figure 2:
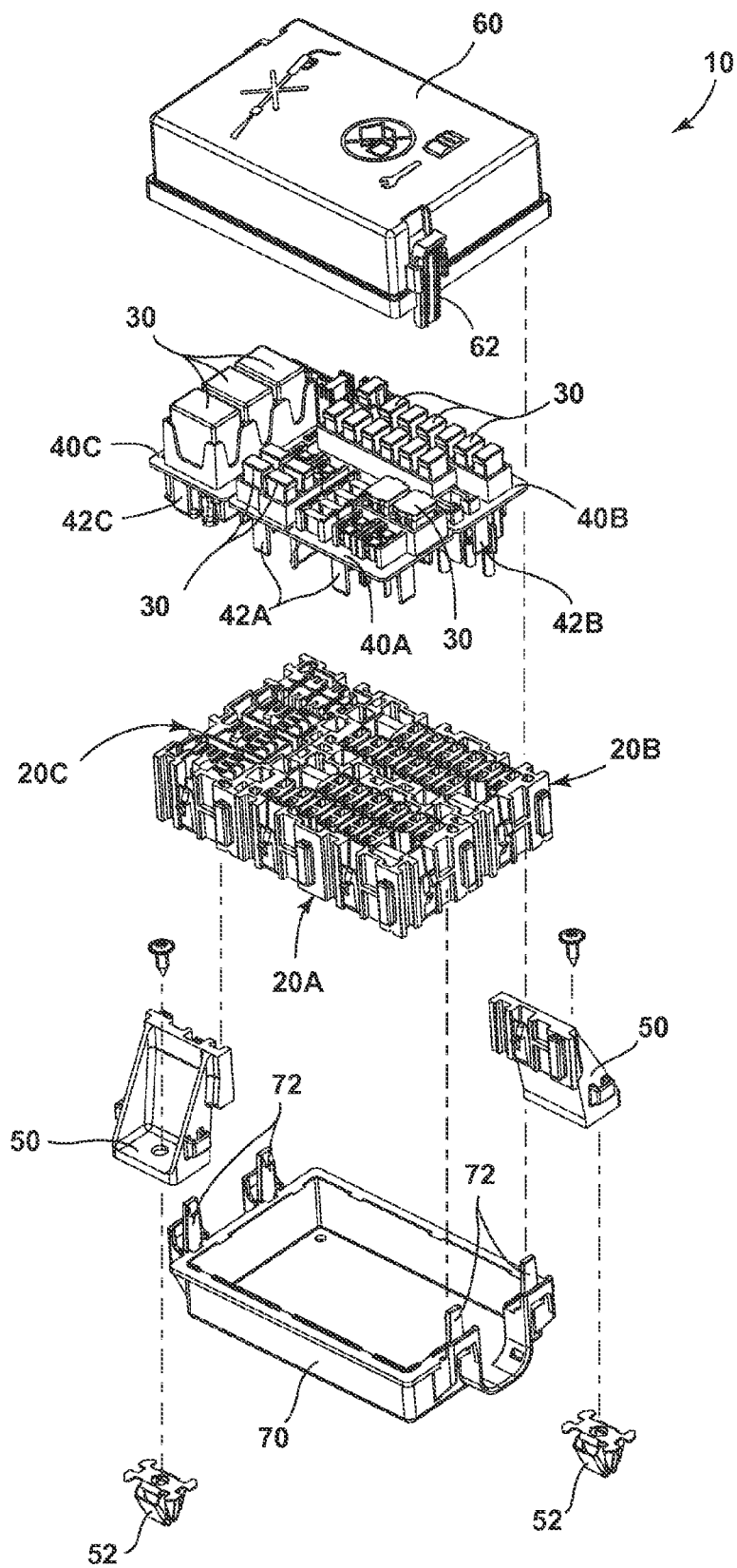
FIG. 2 is an exploded perspective view of the power distribution box shown in FIG. 1.

Referring now to FIG. 2, an exploded view of the power distribution box 10 is provided. As generally shown, the power distribution box 10 may include a plurality of support modules 20A, 20B, and 20C, which will be collectively referred to as the support modules 20. The support modules 20 can be interlocked or otherwise connected together to form a main body of the power distribution box 10. A wide-variety of electrical components 30 may be provided on a plurality of support plates 40A, 40B, and 40C, which will be collectively referred to as the support plates 40, although such is not required. The support plates 40 may, in turn, be supported or otherwise provided on the support modules 20. The support modules 20, electrical components 30, and support plates 40 will be described in further detail below.

In an embodiment, the power distribution box 10 may also include a plurality of mounting brackets 50, although such is not required. For example and without limitation, the mounting brackets 50 may be connected to or otherwise provided on the support modules 20 to mount the power distribution box 10 within an engine compartment of the automobile, as will be explained below. Also, a first or upper cover 60 may be removably secured over an upper surface of the support modules 20, and a second or lower cover 70 may be removably secured over a lower surface of the support modules 20 to enclose and protect the electrical components 30, although such is not required. It should be appreciated that the power distribution box 10 of the present disclosure is not limited to the illustrated embodiment, but may include other components that are suitable for use with power distribution boxes.

Figure 3:
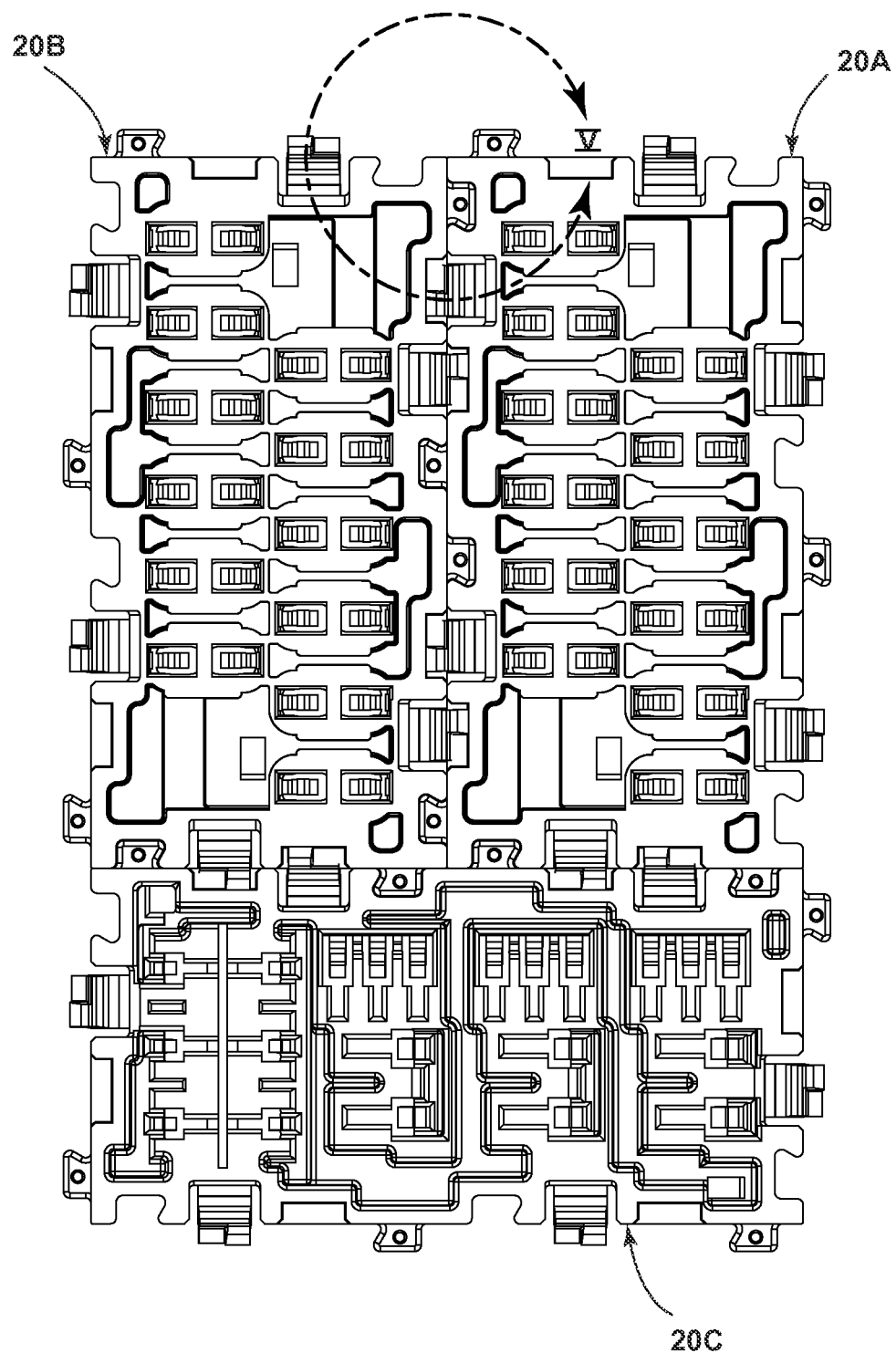
FIG. 3 is a top view of the support modules connected together as shown in FIG. 2.
Figure 4:
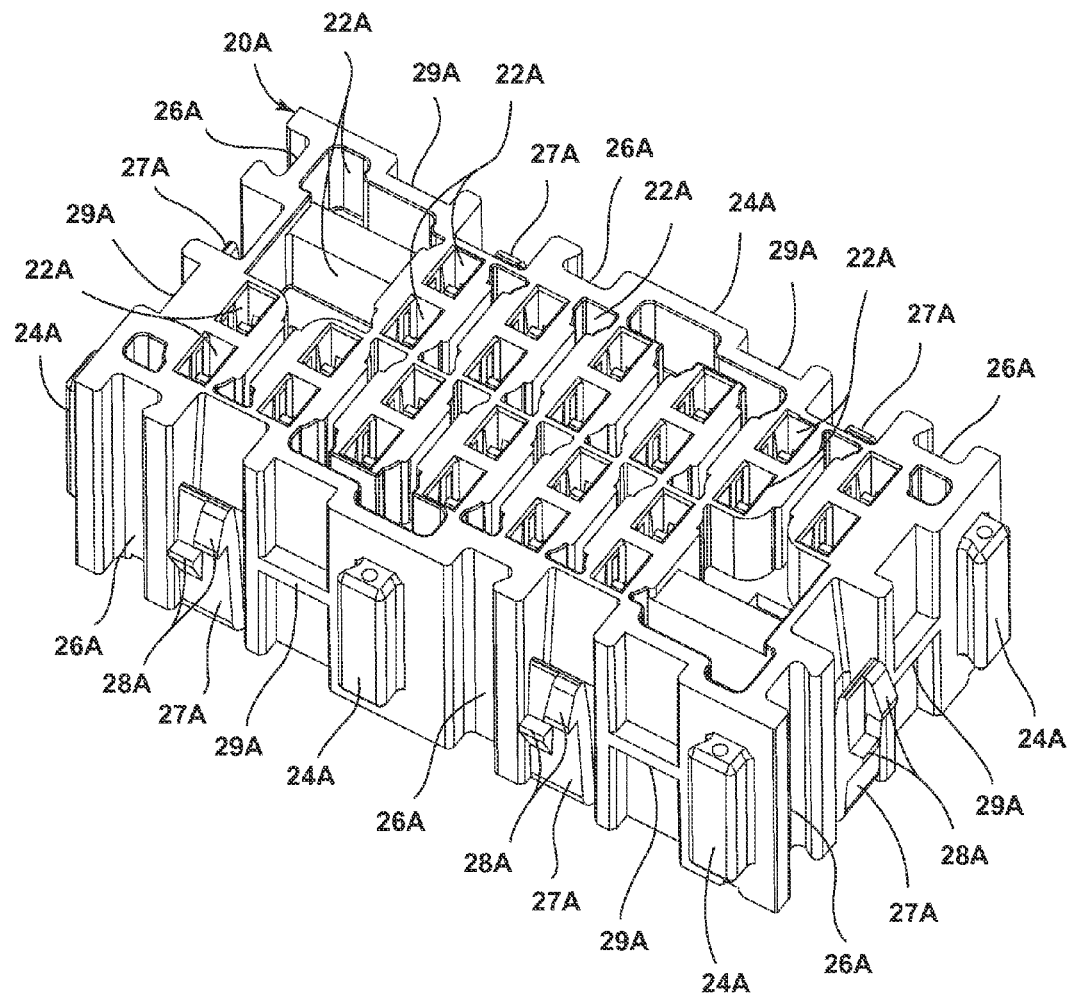
FIG. 4 is a perspective view of a single support module shown in FIG. 3.

Referring now to FIGS. 3 and 4, the support modules 20 will be described in further detail. In an embodiment, as generally shown in FIG. 3, the power distribution box 10 may include three support modules 20A, 20B, and 20C. In other embodiments, however, the power distribution box 10 may include any suitable number of support modules 20. For example, the power distribution box 10 may theoretically have infinite combinations and configurations of support modules 20 to form a body having various shapes or sizes.

In embodiments, the support modules 20 may be made from an electrically insulated or non-conductive material that is generally rigid. For example and without limitation, the support modules 20 can be made from a polymer or other plastic material and may be formed using a molding process or the like. In other embodiments, the support modules 20 can be made from other suitable materials and can be formed or otherwise produced using other suitable manufacturing processes.

As generally shown in FIG. 3, each of the support modules 20A, 20B, and 20C may include similar structural features. Therefore, only one support module 20A will be described in further detail with reference to FIG. 4. It should be appreciated, however, that the respective support modules 20A, 20B, and 20C may have different structural features, shapes, and/or dimensions.

Referring now to FIG. 4, the illustrated support module 20A may be a generally rectangular-shaped block having a first or upper surface, a second or lower surface, and four side surfaces. In other embodiments, the support module 20A may have various other suitable shapes including, but not limited to, a square or other polygonal shapes.

The support module 20A may include a plurality of electrical sockets 22A that can be configured to receive portions of the electrical components 30. For example, the electrical sockets 22A may define apertures that can extend through the support module 20A from the upper surface to the lower surface. Alternatively or in addition, the electrical sockets 22A may define apertures that partially extend into the support module 20A from one of the upper surface and the lower surface. Further, as generally shown, the electrical sockets 22A may have a variety of suitable shapes and sizes.

Figure 5:
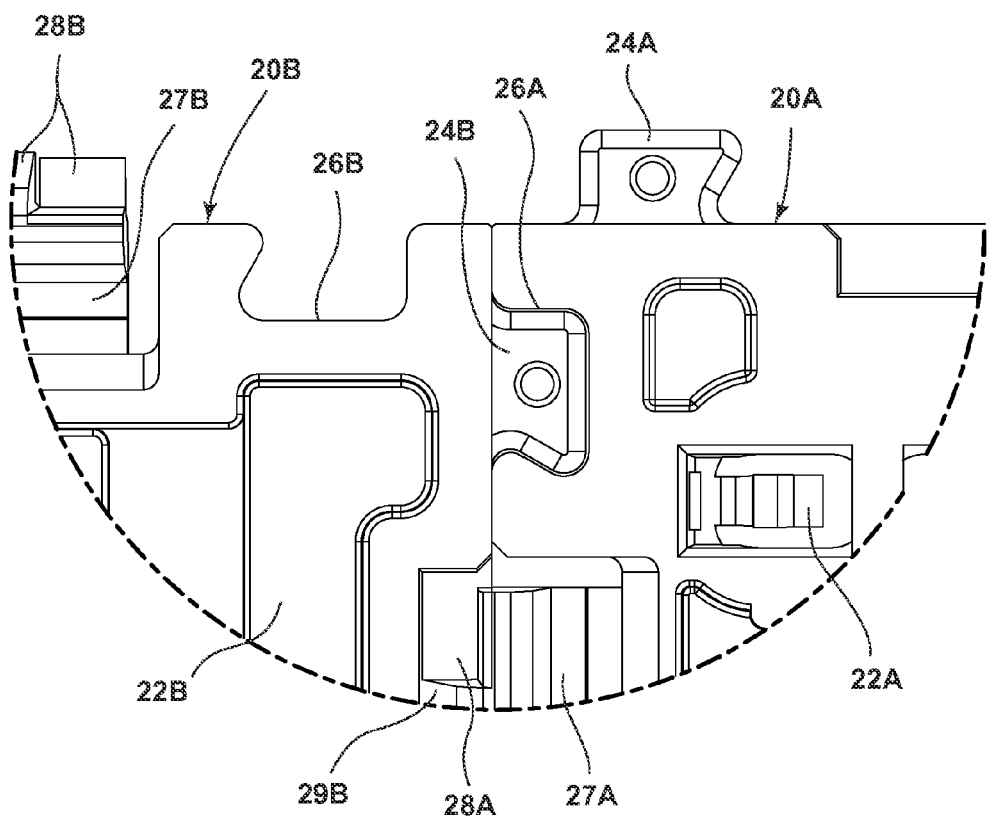
FIG. 5 is an enlarged top view of a portion of two support modules connected together as indicated by the dashed circle V in FIG. 3.

The support module 20A may also include a plurality of interconnectable elements for connecting the support modules 20 together. For example and without limitation, the support module 20A may include a plurality of guide rails 24A that can be located along at least one or more of the side surfaces thereof. As generally shown in FIG. 4, the guide rails 24A may extend outwardly from their respective side surface and in a generally vertical direction, which can be generally perpendicular to the upper and lower surfaces of the support module 20A. The guide rails 24A may also have a dove-tail cross-sectional shape when viewed from the top of the support module 20A, as generally shown in FIGS. 3 and 5. In other embodiments, however, the guide rails 24A may have other cross-sectional shapes that can be suitable for a tongue-and-groove connection, as will be explained below.

The support module 20A may also include a plurality of grooves 26A that can be located along at least one or more of the side surfaces thereof. The grooves 26A may extend inwardly into their respective side surface and in a generally vertical direction, which can be generally perpendicular to the upper and lower surfaces of the support module 20A. Further, the grooves 26A may fully extend from the upper surface to the lower surface or, in other embodiments, may extend from one of the upper and lower surfaces.

The grooves 26A may have a dove-tail cross-sectional shape when viewed from the top of the support module 20A, as generally shown in FIGS. 3 and 5. Thus, the cross-sectional shape of the grooves 26A may generally correspond in mating fashion with the cross-sectional shape of the guide rails 24A to form interlocking tongue-and-groove connections. In other embodiments, however, the grooves 26A may have other suitable cross-sectional shapes and need not necessarily correspond with the cross-sectional shape of the guide rails 24A.

The support module 20A may also include at least one latch member 27A that is configured to lock the support modules 20 together after they are assembled, although such is not required. For example and without limitation, the support module 20A may include a plurality of latch members 27A provided along at least one or more of the side surfaces. As generally shown in FIG. 4, the latch members 27A may be cantilevered along the respective side surfaces of the support module 20A. Thus, the latch members 27A may be deflectable relative to the side surfaces of the support module 20A, at least one purpose of which will be explained below. In other embodiments, the latch members 27A may be other suitable latching mechanisms configured to lock the support modules 20 together.

In an embodiment, the latch members 27A may include a pair of opposing tabs 28A provided on an outer surface thereof, respectively. The opposing tabs 28A may define opposing end walls that are spaced apart from one another and may include ramped surfaces that slope away from one another in opposite directions. It should be appreciated that the opposing tabs 28A can have other suitable configurations to accomplish the functions described below.

The support module 20A may also include at least one detent rib 29A that extends outwardly from at least one side surface thereof, although such is not required. For example and without limitation, the support module 20A may include a plurality of detent ribs 29A provided along at least one or more of the side surfaces. As generally shown, the detent ribs 29A may be flat rib members having a thickness that is slightly smaller than the distance between the opposing end walls of the opposing tabs 28A, at least one purposes of which will be explained below. The detent ribs 29A may, however, have other suitable shapes or dimensions.

As generally shown in FIG. 4, the guide rails 24A that are provided on a first side surface of the support module 20A may be located directly opposite the grooves 26A that are provided on a second or opposite side surface of the support module 20A. Similarly, the latch members 27A that are provided on a first side surface of the support module 20A may be located directly opposite the detent ribs 29A provided on a second or opposite side surface of the support module 20A.

Referring now to FIGS. 3 and 5, a first support module 20A and a second support module 20B connected together will be described. As explained above and generally shown in FIG. 5, the second support module 20B may have similar features as the first support module 20A. These similar features have been identified with common reference numerals (i.e., 22B, 24B, 26B, etc.).

When the first and second support modules 20A and 20B are connected together, at least one guide rail 24A on the first support module 20A may be aligned with and disposed within at least one groove 26B on the second support module 20B. Likewise, at least one latch member 27A on the first support module 20A may be respectively aligned with at least one detent rib 29B on the second support module 20B such that the detent rib 29B can be engaged between the opposing tabs 28A.

While still referring to FIGS. 3 and 5, a method of assembling the support modules 20A, 20B, and 20C together in accordance with an embodiment of the present disclosure will be explained. The first support module 20A and the second support module 20B may be initially placed adjacent to one another in a desired configuration such as, for example, in a side-by-side configuration as generally shown. The second support module 20B may then be moved in a vertical direction relative to the first support module 20A such that the guide rails 24B of the second support module 20B may be aligned with and received within the grooves 26A of the first support module 20A. The second support module 20B can continue to be moved in a vertical direction relative to the first support module 20A until respective detent ribs 29B on the second support module 20B deflect the latch members 27A and are received between opposing tabs 28A on the first support module 20A. In this position, the first and second support modules 20A and 20B may be interlocked or otherwise connected together. Because the opposing tabs 28A may have ramped surfaces that slope in opposite directions, the second support module 20B can be respectively moved in an upward or downward direction relative to the first support module 20A and still allow the support modules 20A and 20B to be assembled together. The third support module 20C may then be connected to end portions or other suitable portions of the first and/or second support modules 20A and 20B using a similar method of assembly.

It should be appreciated that the support modules 20 can be interlocked or otherwise connected together in one of multiple possible configurations to form a body of the power distribution box 10 having one of a plurality of possible configurations which define different footprints (e.g., a top plan view). For example, the support modules 20 can be connected together in a side-by-side configuration, an end-to-side configuration, an end-to-end configuration, or various other combinations. In theory, the support modules 20 may be connected together in one of infinite configurations to define a variety of footprints having different shapes or sizes.

As described above and generally shown in FIG. 2, the power distribution box 10 may be configured to support a plurality of electrical components 30. The electrical components 30 can include, but is not limited to, fuses, relays, switches, resistors, capacitors, and the like. The electrical components 30 can be supported on the upper surfaces of the support modules 20, and the contact terminals of the electrical components 30 may extend into the electrical sockets 22 of the support modules 20. A wire harness having an end connector and a plurality of wires can be attached to the opposite surface or lower surface of the support modules 20 for connection with the electrical components 30. The wires can be routed to various subsystems and other electronic devices in the automobile.

As explained above and generally shown in FIG. 2, the power distribution box 10 may include at least one support plate 40 for arranging and/or supporting the electrical components 30 on the support modules 20. For example and without limitation, the power distribution box 10 can include a plurality of support plates 40A, 40B, 40C (collectively referred to as the support plates 40) that may generally correspond in number with the support modules 20A, 20B, and 20C. Also, the support plates 40 may have the same general size and shape, respectively, as the upper surfaces of the corresponding support modules 20, although such is not required.

In a non-limiting example, the support plates 40 can be circuit boards or other supporting members that may be configured to support the electrical components 30 on the support modules 20. For example, the support plates 40 may include various mounting features having corresponding thru-holes for supporting the electrical components 30 thereon. The illustrated support plates 40 may also include a plurality of support legs 42A, 42B, and 42C that can extend from a lower surface thereof for aligning and mounting the support plates 40 on the corresponding support modules 20. For example, the support legs 42A, 42B, and 42C may be configured to extend into the grooves 26 of the respective support modules 20. In other embodiments, the support plates 40 may be mounted on the support modules 20 using various other features including, but not limited to, latch members, clips, fasteners, and the like.

As generally shown in FIGS. 1 and 2, the power distribution box 10 may also include at least one mounting bracket 50, although such is not required. For example and without limitation, the power distribution box 10 may include a plurality of mounting brackets 50 provided along at least one or more of the side surfaces thereof. The mounting brackets 50 can be configured to mount the power distribution box 10 within an engine compartment or other compartment of the automobile.

The mounting brackets 50 may be interlocked or otherwise connected to the side surfaces of the support modules 20. For example, the mounting brackets 50 may include at least one guide rail, groove, and/or latch member for attaching the mounting brackets 50 to the support modules 20. It should be appreciated that the mounting brackets 50 can be secured to the respective support modules 20 in one of multiple configurations. In turn, the mounting brackets 50 can then be anchored or otherwise secured to the automobile using clips 52, as generally shown, or threaded fasteners, toggle bolts, anchor bolts, and the like. As will be described below in another embodiment, the power distribution box 10 may be mounted to the automobile using a pivotal support system.

As generally shown in FIGS. 1 and 2, the power distribution box 10 may also include an upper cover 60 and/or a lower cover 70, although such are not required. The upper and lower covers 60 and 70 can be removably secured over the upper and lower surfaces, respectively, of the support modules 20 to enclose and protect the electrical components 30 from accidental contact and/or undesired exposure to environmental elements. In an embodiment, for example, the upper and lower covers 60 and 70 may be removably secured to the support modules 20 by latch members 62 and 72, respectively. The latch members 62 and 72 may be configured to engage the latch members 27 and/or the detent ribs 29 on the support modules 20. In other embodiments, the upper and lower covers 60 and 70 may be removably secured to the support modules 20 using other suitable fasteners including, but not limited to, clips, threaded fasteners, straps, hinges, and the like.

Figure 6:
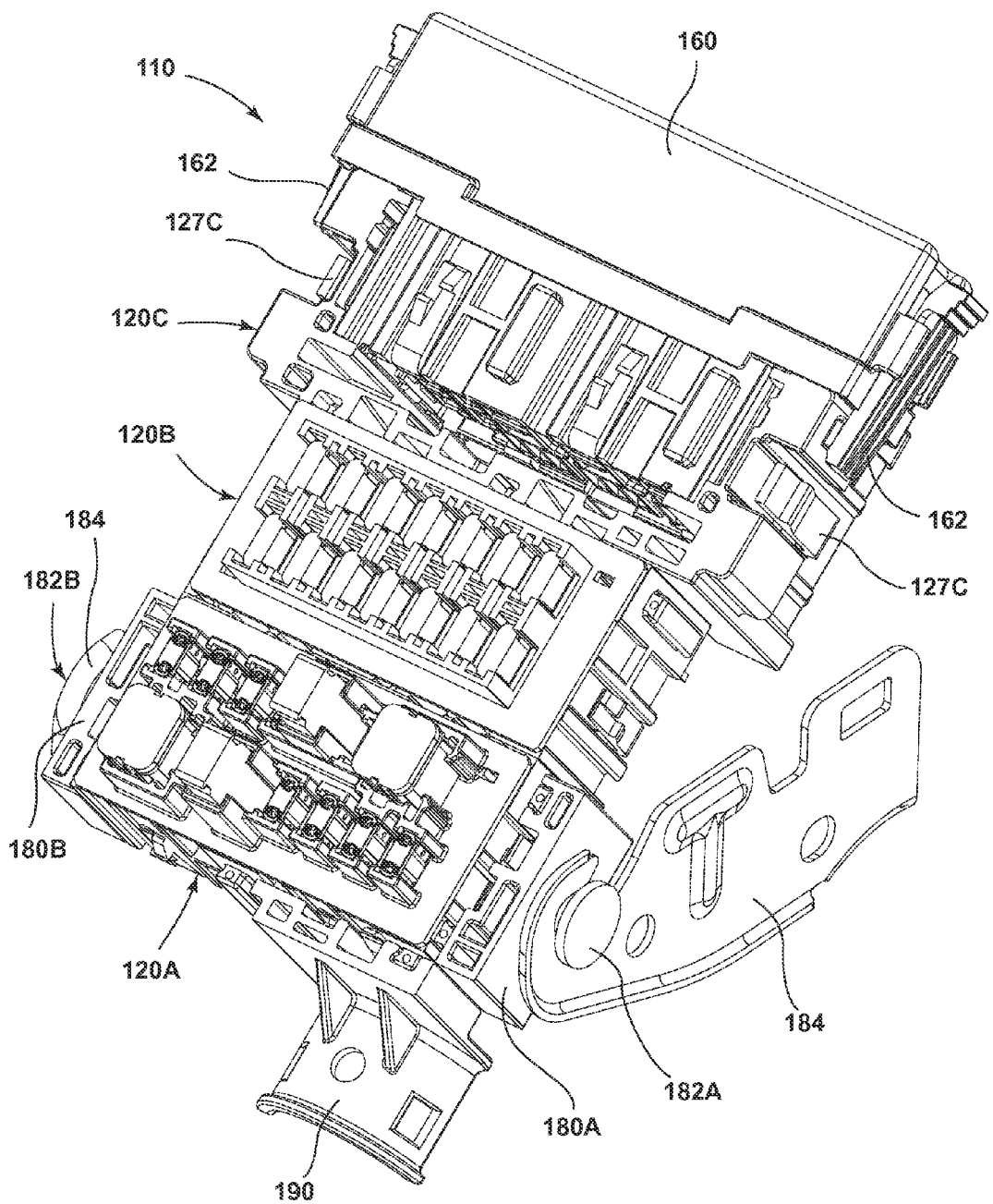
FIG. 6 is a perspective view of a power distribution box that includes a plurality of support modules connected together according to another embodiment of the present disclosure.
Figure 7:
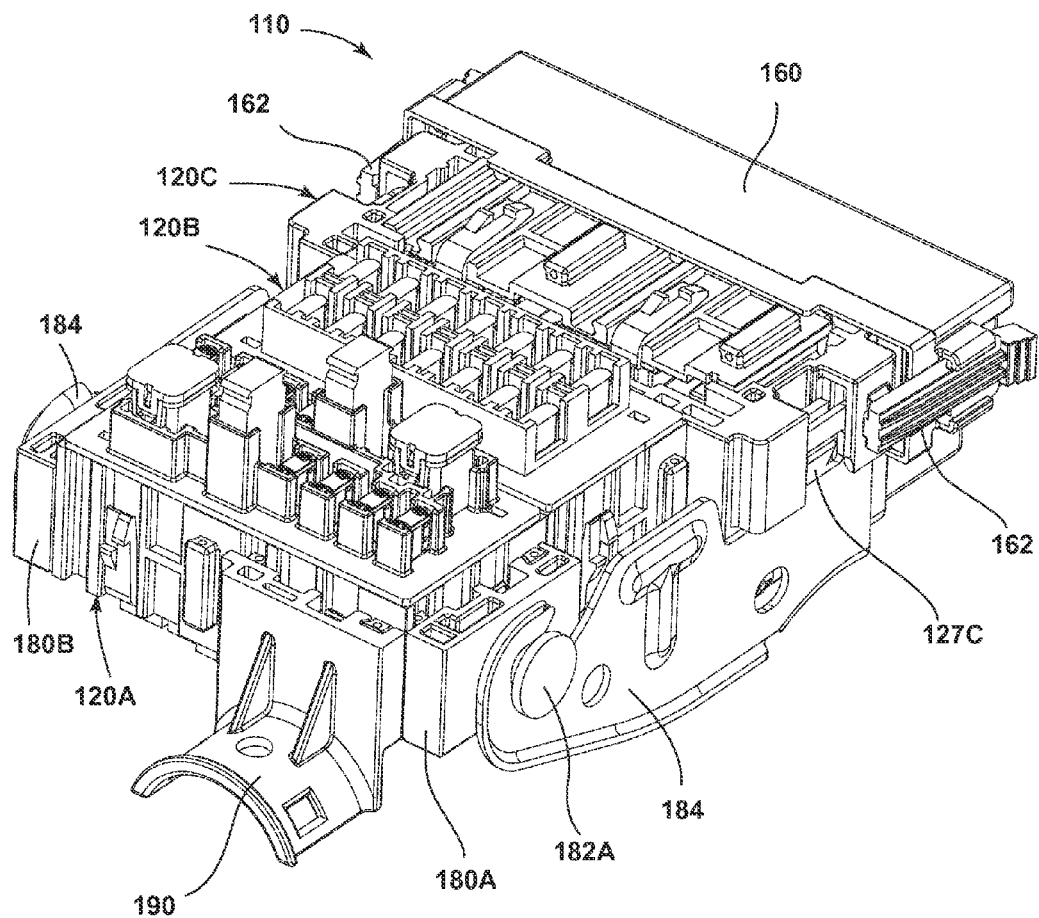
FIG. 7 is a perspective view of the power distribution box shown in FIG. 6.

Referring now to FIGS. 6 and 7, a power distribution box in accordance with another embodiment of the present disclosure is generally shown at 110. The power distribution box 110 may include similar structural features as described and generally shown above in the previous embodiment, although such is not required. Similar features have been numbered with common reference numerals but have been increased by a value of 100 (e.g., 110, 120, 130, etc.). It should be appreciated that similar features can be structured similarly, operate similarly, and/or have the same function unless otherwise indicated by the drawings or this description.

In one non-limiting example, the power distribution box 110 may include a plurality of support modules 120A, 120B, and 120C that can be interlocked or otherwise connected to one another. As generally shown, the support modules 120A, 120B, and 120C may have a different shapes and/or sizes and can be connected together in a side-by-side configuration.

Alternatively or in addition to mounting brackets 50 as described in the previous embodiment, the power distribution box 110 may include a pair of pivot support modules 180A and 180B. The pivot support modules 180A and 180B can be configured to pivotally support the power distribution box 110 on a pair of support brackets 184 that are, in turn, anchored to the automobile. As generally shown, the pivot support modules 180A and 180B may be connected to opposite sides of support module 120A. For example, the pivot support modules 180A and 180B may each include at least one guide rail, groove, and/or latch member for attaching the respective pivot support modules 180A and 180B to the support module 120A, although such is not required.

As generally shown in FIG. 6, the pivot support modules 180A and 180B may each include a round pivot support 182A and 182B, respectively, and the support brackets 184 may define corresponding slots. To assemble the power distribution box 110 within the automobile, the round pivot supports 182A and 182B can be inserted into the slots of the support brackets 184. The power distribution box 110 may then be pivoted until it is reaches a final position, as generally shown in FIG. 7. In an embodiment, the power distribution box 110 can be secured in position, for example, when at least one latch mechanism 127C provided on support module 120C engages a portion of the support bracket 184. It should be appreciated, however, that the power distribution box 110 of the present disclosure is not limited to the illustrated embodiments, but may be mounted or otherwise supported on the automobile other than as generally shown herein.

The power distribution box 110 may also include a wire harness support member 190, although such is not required. As will be explained below, the wire harness support member 190 can be configured to secure a wire harness or the like to the power distribution box 110. Thus, the wire harness support member 190 can be attached to any of the support modules 120. For example, the wire harness support member 190 may include at least one guide rail, groove, and/or a latch member for attaching the wire harness support member 190 to one or more of the support modules 120. To secure the wire harness to the power distribution box 110, a flexible strap, cable tie, clamp, or other suitable fastening device can extend around the wire harness support member 190 and the wire harness. Alternatively or in addition, the wire harness support member 190 may include other suitable features for securing a wire harness to the power distribution box 110.

It should be appreciated that the power distribution boxes 10, 110 disclosed herein may provide a number of advantages. For example and without limitation, the power distribution boxes 10, 110 may eliminate the need for a support frame. This may reduce the cost to produce and assemble the power distribution boxes 10, 110. Further, the support modules 20, 120 may be connected in one of theoretically infinite configurations to form a body of the power distribution box having one of a plurality of possible configurations which define different footprints for use in a variety of applications. As such, the power distribution boxes 10, 110 may enable the support modules 20, 120 and other components thereof to be standardized (i.e., universal) for use across multiple makes and models of automobiles. This may reduce the design costs, manufacturing costs, and inventory costs associated with previous power distribution boxes specifically designed for a particular application. It should be appreciated that the power distribution boxes 10, 110 may also provide other advantages not mentioned or described herein.

The principal and mode of operation of this invention have been explained and illustrated in various embodiments. However, it must be understood that the concepts may be practiced other than as specifically explained and illustrated without departing from their spirit or scope.

What is claimed is:

1. A power distribution box comprising:
a first support module comprising a plurality of sides having a plurality of outwardly extending interconnectable elements and a plurality of interconnectable grooves, the first support module further comprising at least one latch member comprising a pair of opposing tabs, the at least one latch member being provided on at least one of the plurality of sides between one of the plurality of outwardly extending interconnectable elements and one of the plurality of interconnectable grooves; and
a second support module comprising a plurality of sides having a plurality of outwardly extending interconnectable elements and a plurality of interconnectable grooves;
wherein an outwardly extending interconnectable element on the first support module is interconnected with an interconnectable groove on the second support module to connect the first and second support modules together to form a body of the power distribution box having one of a plurality of possible configurations which define different footprints.

2. The power distribution box of claim 1, wherein the interconnectable elements are provided on adjacent sides of at least one of the first and second support modules.

3. The power distribution box of claim 1, wherein the interconnectable elements are provided on three sides of at least one of the first and second support modules.

4. The power distribution box of claim 1, wherein the first support module includes a plurality of guide rails and the second support module includes a plurality of grooves, and a guide rail is disposed within a groove to connect the first and second support modules together.

5. The power distribution box of claim 4, wherein the first support module includes the plurality of guide rails alternating a plurality of grooves, and the second support module includes a plurality of guide rails alternating the plurality of grooves.

6. The power distribution box of claim 1, wherein the pair of opposing tabs of the at least one latch member provided on the first support module are configured to engage the second support module.

7. The power distribution box of claim 6, wherein the at least one latch member extends in a cantilevered fashion along a side of the first support module.

8. The power distribution box of claim 6, wherein the second support module includes a detent rib, and the detent rib is engaged by the pair of the opposing tabs of the at least one latch member provided on the first support module.

9. The power distribution box of claim 8, wherein the detent rib is disposed between the opposing tabs.

10. The power distribution box of claim 1, wherein the first and second support modules are rectangular in shape and are connectable in a side-by-side configuration, an end-to-end configuration, and an end-to-side configuration.

11. The power distribution box of claim 1, further including a mounting bracket that is connected to at least one of the first and second support modules.

12. The power distribution box of claim 11, wherein the mounting bracket includes an interconnectable element to connect the mounting bracket to at least one of the first and second support modules.

13. The power distribution box of claim 1, further including a pair of pivot support modules that are connected on opposite sides of one of the first and second support modules, and the pivot support modules each include a round pivot support member.

14. The power distribution box of claim 13, wherein the pivot support modules each include an interconnectable element to connect the pivot support modules to one of the first and second support modules.

15. The power distribution box of claim 1, further including a first support plate attached to the first support module and a second support plate attached to the second support module for supporting electrical components on the first and second support modules.

16. The power distribution box of claim 1, further including a wire harness support member connected to at least one of the first and second support modules.

17. The power distribution box of claim 16, wherein the wire harness support member includes an interconnectable element to connect the wire harness support member to the at least one first and second support modules.

18. A power distribution box comprising:
a first support module having a plurality of sides and each side includes a guide rail, a groove, a latch member comprising a pair of opposing tabs, and a detent rib; and
a second support module having a plurality of sides and each side includes a guide rail, a groove, a latch member comprising a pair of opposing tabs, and a detent rib;
wherein a guide rail is disposed within a groove to connect the first and second support modules together to form a body of the power distribution box having one of a plurality of possible configurations which define different footprints, and a pair of opposing tabs of a latch member engages a detent rib to lock the first and second support modules together.

19. The power distribution box of claim 18, wherein the first support module includes a plurality of alternating guide rails and grooves provided on each side thereof, and the second support module includes a plurality of alternating guide rails and grooves provided on each side thereof.

20. The power distribution box of claim 18, wherein the first and second support modules are rectangular in shape and are connectable in a side-by-side configuration, an end-to-end configuration, and an end-to-side configuration.

* * * * *